United States Patent
Ritter et al.

(10) Patent No.: US 10,768,794 B2
(45) Date of Patent: Sep. 8, 2020

(54) TRUNCATED SYNCHRONIZATION OF DATA OBJECT INSTANCES

(71) Applicant: SAP SE, Walldorf (DE)

(72) Inventors: Gerd Ritter, Heidelberg (DE); Tim Kornmann, Reilingen (DE); Tobias Stolzenberger, Heidelberg (DE)

(73) Assignee: SAP SE, Walldorf (DE)

( * ) Notice: Subject to any disclaimer, the term of this patent is extended or adjusted under 35 U.S.C. 154(b) by 630 days.

(21) Appl. No.: 14/977,475

(22) Filed: Dec. 21, 2015

(65) Prior Publication Data

US 2017/0177183 A1 Jun. 22, 2017

(51) Int. Cl.
*G06F 3/0484* (2013.01)
*G06F 3/0482* (2013.01)
*H04L 29/08* (2006.01)
*G06F 16/27* (2019.01)

(52) U.S. Cl.
CPC .......... *G06F 3/0484* (2013.01); *G06F 3/0482* (2013.01); *G06F 16/27* (2019.01); *H04L 67/1095* (2013.01)

(58) Field of Classification Search
CPC ... G06F 3/0484; G06F 3/0482; H04L 67/1095
USPC ....................................................... 707/610
See application file for complete search history.

(56) References Cited

U.S. PATENT DOCUMENTS

| | | |
|---|---|---|
| 7,533,135 B2 | 5/2009 | Klein et al. |
| 7,730,056 B2 | 6/2010 | Kaiser et al. |
| 7,808,480 B2 | 10/2010 | Gross |
| 7,844,912 B2 | 11/2010 | Kornmann |
| 8,099,661 B2 | 1/2012 | Ritter |
| 8,264,460 B2 | 9/2012 | Gross |
| 8,396,827 B2 | 3/2013 | Gross et al. |
| 8,606,723 B2 | 12/2013 | Seubert et al. |
| 8,655,756 B2 | 2/2014 | Seubert et al. |

(Continued)

OTHER PUBLICATIONS

Doron, Eyal, "Troubleshooting Outlook Synchronization Problems", downloaded from http://o365info.com/troubleshooting-outlook-synchronization/ on Dec. 14, 2015, 58 pages.

(Continued)

*Primary Examiner* — Hung T Vy
(74) *Attorney, Agent, or Firm* — Klarquist Sparkman LLP

(57) ABSTRACT

A synchronization protocol is used to transfer information from a remote computing system to a client device. At the remote computing system, synchronization configuration information is retrieved. The synchronization configuration includes a synchronization rule specifying a data object schema to which the synchronization rule will apply, truncation criteria, and a truncation threshold. The truncation threshold specifies a maximum amount of shared data object instances of the data object schema that may be sent to the client device during a synchronization task. The remote computing system analyzes metadata of a plurality of shared data object instances of the data object schema. Relevant shared data object instances of the plurality of shared data object instances meeting the truncation criteria are determined by the remote computing system. The relevant data object instances are sent from the remote computing system to the client device until the truncation threshold is met.

20 Claims, 9 Drawing Sheets

(56) References Cited

U.S. PATENT DOCUMENTS

| | | | |
|---|---|---|---|
| 8,689,119 B2 | 4/2014 | Ritter et al. | |
| 8,694,397 B2 | 4/2014 | Seubert et al. | |
| 8,706,804 B2 | 4/2014 | Kornmann et al. | |
| 8,893,031 B2 | 11/2014 | Kornmann et al. | |
| 9,020,973 B2 | 4/2015 | Stumpf et al. | |
| 9,032,001 B2 | 5/2015 | Stumpf et al. | |
| 9,053,445 B2 | 6/2015 | Brunswig et al. | |
| 9,072,798 B2 | 7/2015 | Ritter et al. | |
| 9,158,932 B2 | 10/2015 | Ritter et al. | |
| 9,165,087 B2 | 10/2015 | Gross | |
| 2003/0233383 A1* | 12/2003 | Koskimies | G06F 17/30581 |
| 2005/0028083 A1 | 2/2005 | Kircher et al. | |
| 2005/0033776 A1 | 2/2005 | Kircher et al. | |
| 2005/0102370 A1 | 5/2005 | Lin et al. | |
| 2006/0080338 A1 | 4/2006 | Seubert et al. | |
| 2006/0085336 A1 | 4/2006 | Seubert et al. | |
| 2006/0085450 A1 | 4/2006 | Seubert et al. | |
| 2006/0095447 A1 | 5/2006 | Dickinson et al. | |
| 2007/0005552 A1 | 1/2007 | Klein et al. | |
| 2007/0005640 A1 | 1/2007 | Klein et al. | |
| 2007/0005666 A1 | 1/2007 | Klein et al. | |
| 2007/0078992 A1 | 4/2007 | Bloch et al. | |
| 2007/0097076 A1 | 5/2007 | Gross | |
| 2008/0154950 A1 | 6/2008 | Gross | |
| 2008/0155523 A1 | 6/2008 | Kornmann | |
| 2008/0162205 A1 | 7/2008 | Gross | |
| 2008/0162207 A1 | 7/2008 | Gross et al. | |
| 2008/0162415 A1 | 7/2008 | Kaiser et al. | |
| 2008/0162563 A1 | 7/2008 | Gross et al. | |
| 2008/0162616 A1 | 7/2008 | Gross et al. | |
| 2008/0162777 A1 | 7/2008 | Kaiser et al. | |
| 2009/0042156 A1 | 2/2009 | Meckelnburg et al. | |
| 2009/0055434 A1* | 2/2009 | Chasman | G06F 17/30578 |
| 2009/0083566 A1* | 3/2009 | Momenee | G06F 17/30575 |
| | | | 713/400 |
| 2009/0164932 A1 | 6/2009 | Ritter | |
| 2009/0171679 A1 | 7/2009 | Salgado et al. | |
| 2009/0193107 A1 | 7/2009 | Srinivasan et al. | |
| 2010/0153501 A1 | 6/2010 | Gabriel et al. | |
| 2010/0321296 A1 | 12/2010 | Gross | |
| 2012/0188996 A1* | 7/2012 | Roka | G06F 17/30174 |
| | | | 370/350 |
| 2012/0290558 A1* | 11/2012 | Gruber | G06F 17/30398 |
| | | | 707/711 |
| 2013/0031493 A1 | 1/2013 | Ritter et al. | |
| 2013/0111343 A1 | 5/2013 | Ritter et al. | |
| 2013/0111381 A1 | 5/2013 | Ritter et al. | |
| 2013/0138608 A1 | 5/2013 | Smith | |
| 2013/0151571 A1 | 6/2013 | Stumpf et al. | |
| 2013/0151585 A1 | 6/2013 | Kornmann et al. | |
| 2013/0159356 A1 | 6/2013 | Stumpf et al. | |
| 2013/0159909 A1 | 6/2013 | Kornmann et al. | |
| 2013/0166596 A1 | 6/2013 | Stumpf et al. | |
| 2013/0167110 A1 | 6/2013 | Gross et al. | |
| 2013/0212067 A1* | 8/2013 | Piasecki | G06F 17/30176 |
| | | | 707/620 |
| 2014/0157154 A1 | 6/2014 | Brunswig et al. | |
| 2014/0172918 A1 | 6/2014 | Kornmann et al. | |
| 2014/0201145 A1 | 7/2014 | Dorman et al. | |
| 2014/0337384 A1 | 11/2014 | Ritter et al. | |
| 2014/0372863 A1 | 12/2014 | Ritter et al. | |
| 2017/0177690 A1 | 6/2017 | Ritter et al. | |

OTHER PUBLICATIONS

"How to Configure iPad/iPhone/iTouch Mail Settings to Increase or Reduce the Amount of Emails Displayed on the Device and/or Change Folder Sync Options", downloaded from https://it.sheridancollege.ca/selfhelp/email/iphone-synch-settings.html on Dec. 14, 2015, 3 pages.

"How to Limit Number of Emails on iPhone", downloaded from http://swapmyapp.com/how-to/limit-number-of-emails-on-iphone/ on Dec. 14, 2015, 9 pages.

"Resolving Sync Conflicts: Frequently Asked Questions", downloaded from http://windows.microsoft.com/en-us/windows-vista/resolving-sync-conflicts-frequently-asked- . . . on Dec. 14, 2015, 4 pages.

"SAP Cloud for Customer Integration with SAP On-Premise: ERP, CRM, BW", 2015, 64 pages.

"SAP Cloud for Customer User Guide", 2014, 296 pages.

"Synchronization Error Folders", downloaded from https://support.office.com/en-in/article/Synchronization-error-folders-e591ed91-f90a-4e5d-a0a . . . on Dec. 14, 2015, 3 pages.

"Understanding Sync Errors and Warnings", downloaded from http//windows.microsoft.com/en-us/windows-vista/understanding-sync-errors-and-warnings on Dec. 14, 2015, 4 pages.

Non-Final Office Action for U.S. Appl. No. 14/977,487, dated Jul. 26, 2018, 29 pages.

Response to Office Action for U.S. Appl. No. 14/977,487, filed Oct. 25, 2018, 11 pages.

Final Office Action for U.S. Appl. No. 14/977,487, dated Feb. 20, 2019, 43 pages.

Response to Office Action for U.S. Appl. No. 14/977,487, dated Apr. 19, 2019, 12 pages.

Non-Final Office Action for U.S. Appl. No. 14/977,487, dated Aug. 20, 2019, 36 pages.

\* cited by examiner

TRUNCATED SYNCHRONIZATION OF DATA OBJECT INSTANCES

FIELD

The present disclosure relates to transferring information between computing systems. For example, the present disclosure provides a protocol that may be used to transfer information from a remote computing system to a client device.

BACKGROUND

Many computing systems allow a user of a client device, such as a desktop computer, a laptop computer, a tablet computer, or a smartphone, to access data that is stored at a remote computing system. For example, the remote computing system may be a cloud computing system. Cloud computing is the use of hardware and software computing resources which are available in a remote location and accessible over a network, such as the Internet. Users are able to lease, buy, or otherwise reserve these computing resources to perform computations and to store their data. For example, data on a local client device can be copied to the remote cloud resources. Cloud resources can provide a number of advantages including cost advantages and/or the ability to adapt rapidly to changing computing resource needs.

In some scenarios, a user working on a client device can access resources of a remote computing system in an interactive, "online" way. However, a remote computing system, including cloud resources, may not always be accessible, such as when a user is working "offline" on a client device. Data can be made available for offline use by sending the data from the remote computing system and storing it on the client device. Considering the volume of data maintained at the remote computing system and accessible to the user during online interaction, it may not be possible, or practical, to store a complete copy of such data on the client device for offline use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present disclosure provides a synchronization protocol that may be used to transfer information from a remote computing system to a client device. In particular, the synchronization protocol can be used to synchronize shared data object instances between the remote computing system and the client device for offline use at the client device. At the remote computing system, synchronization configuration information (e.g., associated with the client device or user) is retrieved. The synchronization configuration information includes a synchronization rule that specifies a data object schema to which the synchronization rule will apply, truncation criteria, and a truncation threshold. The truncation threshold specifies a maximum amount of shared data object instances of the data object schema that may be sent to the client device during a synchronization task (e.g., in terms of a count of data object instances that can be stored on the client device, an amount of storage on the client device, or a percentage of storage on the client device).

The remote computing system analyzes metadata of a plurality of shared data object instances of the data object schema. Relevant shared data object instances of the plurality of shared data object instances of the data object schema meeting the truncation criteria are determined by the remote computing system. The relevant data object instances are sent from the remote computing system to the client device until the truncation threshold is met.

In another embodiment, the present disclosure provides a synchronization protocol that may be used to transfer information to a client device from a remote computing system. In particular, the synchronization protocol can be used to synchronize shared data object instances between the remote computing system and the client device for offline use at the client device. The client device sends a synchronization request to the remote computing system. The client device receives a plurality of shared data object instances of a data object schema. The shared data object instances include metadata. The shared data object instances are selected based on truncation criteria associated with a synchronization rule of synchronization configuration information. The shared data object instances are received until a truncation threshold of the synchronization rule is met.

The foregoing and other objects, features, and advantages of the present disclosure will become more apparent from the following detailed description, which proceeds with reference to the accompanying figures.

DETAILED DESCRIPTION

Overview

Figure 1:
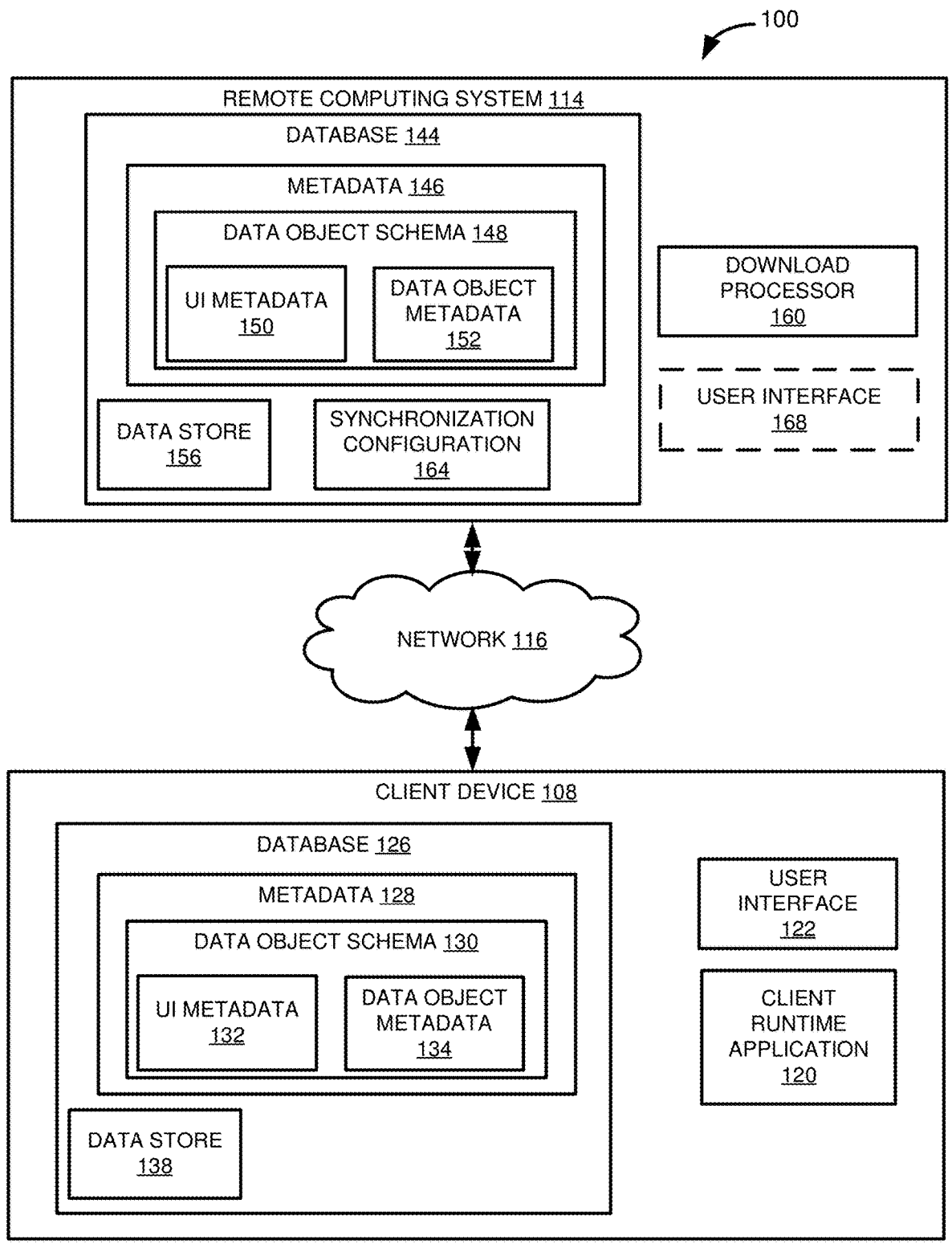
FIG. 1 is a block diagram of an example software architecture for implementing a truncated synchronization protocol according to an embodiment of the present disclosure.

Users across an organization may have data, including data objects (such as documents and business objects, potentially representing accounts, sales orders, sales opportunities, etc.), that are stored on client devices and/or on a remote computing system, such as at a cloud storage facility. There can be trade-offs between storing the data and data objects (including individual data object instances of a data object) at either the client devices or at the remote computing system. For example, data and data objects stored on the client device (e.g., a desktop computer, a laptop computer, a tablet computer, or a mobile phone (such as a smartphone)), can be accessible even when the client device is disconnected from the network. Thus, a user on a business trip or working from home can continue to work with data, and access and modify data objects (including instances thereof) stored locally, even if the client device does not have a network connection.

Data objects and data, including instances of data objects, stored on a remote computing system may be accessible to multiple members of an organization, such as a team of members. For example, a cloud storage facility can be used as a central repository for data objects, data object instances, and/or datasets created and/or collected by the team. Having data objects and instances accessible to the team may foster collaboration among the team, help the team to make better decisions, and increase the availability and accuracy of the data objects and data, including data object instances.

As an example, users may analyze and transform collected data to create data objects and data object instances, such as individual records, documents, and reports, that can be shared with other users of the organization. The data objects and data object instances to be shared can be created on a local client device and then manually or automatically uploaded to a remote computing system, such as a server or a cloud storage facility. The data objects and data object instances may be created regularly, such as for a weekly or a monthly report. The data objects and data object instances, being shared, can be accessed and modified by multiple users.

In general, a "shared" data object (or data object instance) is a data object (or instance) that may be stored on a remote computing system as well as on one or more client devices. The client device(s) may temporarily or permanently store the shared data object (or instance). Shared data objects (or instances) may be periodically updated, or replaced, with an updated version, such as during a synchronization process. A shared data object (or instance) may have an attribute that specifically designates the data object (or instance) as being available for sharing (even if the specific data object, or instance, is not actually shared at a particular point). In at least some implementations, a shared data object (or instance) can be modified by multiple users, or a single user at more than one device. Shared data objects (or instances) can, in some cases, be simultaneously accessed or modified by more than one user, or by a user at multiple devices. If desired, changes made to the shared data object (or instance) can be reconciled, such as at the remote computing system. In other cases, only a limited number of copies (such as a single copy) of the shared data object (or instance) can be modified, but other copies may be provided on a read-only basis. If desired, the status of a shared data object (or instance) may be changed. For example, a shared data object (or instance) can be marked as being locked (or unavailable for sharing) or as being unavailable for changes, but being available for reading. Similarly a locked (or un-shared) data object (or instance) may be unlocked (or shared).

Typically, the storage capacity (for both memory and persistent storage) of the remote computing system (such as the cloud facility) exceeds the storage available on the client device. In many cases, even for a specific type of data object, the resources of the client device are insufficient, or impractical, to hold all of the data object instances available from the remote computing system. A user typically will want to access the most relevant data, such as the most recently modified data object instances available at the remote computing system.

As described herein, a synchronization protocol is provided between a client device and a remote computing system for synchronizing shared data object instances based on synchronization configuration information (e.g., associated with the client device, associated with the user). The synchronization configuration information can include one or more synchronization rules. A synchronization rule can apply to one or more types of data objects and include truncation criteria that will be used to identify what data objects and data object instances are of interest to the user. The synchronization rule can also include a truncation threshold, which defines, for example, the number of data object instances meeting the truncation criteria that should be received, or maintained, by the client device.

Example 1—System Implementing Truncated Synchronization Between a Remote Computing System and a Client Device FIG. 1 is a block diagram of an example software architecture 100 for implementing truncated synchronization between a client device 108 and a remote computing system 114. The client device 108 and the remote computing system 114 can communicate via a network 116. The remote computing system 114 can be, for example, part of a datacenter of a cloud service provider or a remote server. The cloud service provider can deliver computing and storage capacity as a service to a community of end recipients from a remote location. The cloud service provider can offer a "private cloud environment," where only one organization has access to the cloud, or the cloud service provider can offer a "public cloud environment" or "multi-tenant environment," where a plurality of customers can operate databases independently of each other. End users can access the cloud service provider using networked client devices, such as the client device 108. Those skilled in the art will recognize that the cloud service provider can be described as a "cloud" environment.

The network 116 can include a local area network (LAN), a Wide Area Network (WAN), the Internet, an intranet, a wired network, a wireless network, a cellular network, combinations thereof, or any network suitable for providing a channel for communication between the remote computing system 114 and the client device 108. It should be appreciated that the network topology illustrated in FIG. 1 has been simplified and that multiple networks and networking devices can be utilized to interconnect the various computing systems disclosed herein. The client device 108 and remote computing system 114 may communicate over the network 116 using any suitable communication protocol. In a specific example, the client device 108 and the remote computing system 114 communicate via the HTTP protocol.

As used herein, the term "send" to a destination entity refers to any way of transmitting or otherwise conveying data within a computer system or between two computer systems, whether the data is directly conveyed or conveyed through one or more intermediate entities. Similarly, the term "receive," such as to receive from an entity, refers to the receipt of data within a computer system or between two computer systems, whether the data is received directly from the computer system of original transmission or received through one or more intermediate entities.

The client device 108 can include various types of clients, such as desktop computers, laptops, tablets, and mobile devices (such as smartphones) running a web browser and/or other client application 120 for facilitating truncated synchronization between the client device 108 and the remote computing system 114. For example, the client application 120 can be part of a business intelligence software suite for enabling a variety of users having different business roles to access, transform, and visualize data. Examples of different business roles (examples of user categories) include sales representatives, territory managers, account managers, analysts, and decision makers. The client application 120 can be implemented in any suitable computing language, such as a programming language and/or a markup language. However, in specific examples, features of the client application 120 are specified in languages such as HTML5 and JavaScript, which are interpreted at runtime by a framework or engine to present user interface components (such as component 122 in FIG. 1) for the client application 120 and data.

The client application 120 can be used to prepare data from one or more sources, create a visualization of the data, and then display the visualization to a user and/or make the data available for the user to modify or query. For example, the user may be provided with the ability to interact with the application 120, and in turn the data, with a user interface component 122.

The client device 108 may include a database 126 that stores metadata 128, which can include metadata for a data object schema 130. The data object schema 130 can include user interface metadata 132 specifying user interface components of a particular type of data object and data object metadata 134, such as other properties (including data members) and methods of the data object schema 130. In specific implementations, the data object schema 130 may be specified in a markup language, such as XML.

The data object schema 130 may specify various properties of the data object, including how data is maintained by the data object and ways of interacting with the data, including methods for accessing, modifying, and visualizing the data. Stated another way, the data object schema 130 can represent, and define, a particular class or type of data object, with data object instances representing particular instances of the type or class. Underlying data for individual data object instances may also be stored in the database 126, such as in data store 138.

In some cases, the data for the data object instances includes metadata. The metadata associated with data of the data object instances can include information such as the original source or creator of the data object instance, the last user to modify the data object instance, the date the data object instance was created, the date the data object instance was last modified, and the identity of the last user to modify the data object instance. In some examples, the metadata is maintained with the data for the data object instance in the data store 138. In other examples, the metadata for the data object instances in maintained elsewhere (or, optionally, in addition to the data store 138), such as in the metadata store 128.

As an example, a particular data object schema (type, or class) may be a sales order. The data object schema 130 may specify user interface components associated with a sales order, such as defining queries that may be run against one or more instances of the sales order data object type (including its data or metadata), ways of manipulating sales order instances (including generating or modifying metadata regarding one or more sales order instances or manipulating underlying data of one or more sales order instances), and ways of displaying or visualizing one or more sales order instances (including their data or metadata), such as reports or summaries.

The data object types may include one or more predefined types. In at least certain aspects of the present disclosure, additional data object schemas may be created and used with the disclosed synchronization protocol. That is, the present disclosure is not, in such implementations, limited to a set of predefined data object schemas. In more specific examples, a new data object schema may be used with existing synchronization configuration information, such as if the new data object schema has metadata matching the metadata used for the truncation criteria, such as metadata indicating the date a data object instance was last modified.

In particular implementations, for offline use, the client application 120, such as in response to user input from the user interface 122, determines appropriate data object instances to access and requests and receives the underlying data for the data object instances from the data store 138. The client application 120 parses the data object schema 130 and data from the data store 138 to take actions requested by a user through the user interface 122, such as requests to query, edit, view, and manipulate data (including metadata) associated with the data object schema 130 or the data object instances. For example, continuing the sales order example, the client application 120 may determine the relevant sales order instances for a user action (such as a report), fetch the relevant data from the data store 138, and parse the data object schema 130, such as in displaying a report or summary to the user.

Similarly, for online use, the client application 120, such as in response to user input from the user interface 122, determines appropriate data object instances to access and requests and receives the underlying data for the data object instances from the data store 156 at the remote computing system, which stores corresponding data object schema 148. The client application 120 parses the data object schema 130 and data from the data store 156 to take actions requested by a user through the user interface 122, such as requests to query, edit, view, and manipulate data (including metadata) associated with the data object schema 130 or the data object instances. For example, continuing the sales order example, the client application 120 may determine the relevant sales order instances for a user action (such as a report), fetch the relevant data from the data store 156, and parse the data object schema 130, such as in displaying a report or summary to the user.

The client device 108 is periodically synchronized with the remote computing system 114. The synchronization may occur at defined intervals (such as daily, weekly, or monthly), at the request of the client device 108 (such as in response to user input), or through a request initiated by the remote computing system 114 (including in response to user input, such as by an administrator, or in response to criteria defined on the remote computing system 114). In specific examples, synchronization is initiated by a user query, such as a query received through the user interface 122.

The remote computing system 114 includes a database 144 that, like the database 126 of the client device 108, includes a metadata store 146, which can store one or more data object schemas 148. The data object schemas 148 can include user interface metadata 150 and data object metadata 152. The database 144 may also include a data store 156 that may store, for example, data (including metadata) relating to instances of one or more data objects schemas.

As described above, the data object instances stored in the data store 156 can be shared between multiple client devices 108. Typically, a copy of a data object instance is sent to a client device 108, either during online use or during synchronization for offline use. Changes made to the data object instance (during online use or offline use) can be returned to the remote computing system 114 and, if desired, applied to the version of the data object instance stored in the data store 156. The remote computer system 114 can include rules for synchronizing changes made by multiple users to the same data object instance. When a data object instance is updated, its data or metadata can be updated to reflect the change, including updating a last-changed date associated with the data object instance.

The remote computing system 114 further includes a download processor 160. The download processor 160 receives synchronization configuration information 164 (which may be stored in the database 144) for a particular client device 108 or a particular user. The synchronization configuration information 164 typically includes one or more truncation criteria and one or more truncation thresholds associated with each of the truncation criteria. In some implementations, the synchronization configuration information 164 applies to all data synchronized with the local client device 108. In other implementations, the synchronization configuration information 164 applies to specific types of data object schemas. The synchronization configuration information 164 can include one or more synchronization rules (including the truncation criteria and threshold), which may be applied to one or more data object schemas. In some cases, multiple synchronization rules may be defined for the same data object schema or schemas. For example, a user, the client device 108, or the remote computing system 114 may determine which of multiple synchronization rules should be applied to the particular data object schema or schemas for a particular type of synchronization event.

In some cases, the synchronization configuration information 164 (and/or one or more of its constituent synchronization rules) is specified by the remote computing system 114, such as through an optional user interface 168. For example, the synchronization configuration information 164 may be specified by an administrator or similarly authorized user. In other examples, the synchronization configuration information 164 may be received from the client device 108. For example, a user may specify synchronization configuration information 164 (or rule thereof) through the user interface 122 to be transmitted to, and stored by, the remote computing system 114. However, the architecture 100 may be configured differently. For example, rather than being stored at the remote computing system 114, the synchronization configuration information 164 may be received by the remote computing system 114 from the client device 108.

The download processor 160 accesses data maintained in the database 144 in order to carry out a truncated synchronization process. For example, the download processor 160 may synchronize metadata in the metadata store 146, such as metadata of one or more data object schemas 148 or data object instances, and data associated with data object instances stored in the data store 156, with the client device 108. In carrying out the synchronization, the download processor 160 applies the truncation criteria and truncation threshold specified in the synchronization configuration information 164.

The truncation criteria may specify a particular metadata component (of the data object schema 148/individual data object instances in the data store 156) to be used in determining what data object instances to send to the client device 108. The metadata component may be, for example, a last-modified date, a date created date, a geographic identifier, a user identifier (such as data object instances stored in the data store 156 that were created or modified by a specific user), or other metadata associated with the data object instances. For example, when the data object is a business object, the metadata can include fields such as a customer name, a customer account, a product name, a geographic region, a sales agent, a sales manager, contact information, a date created date, and a date modified date. Truncation criteria may also be combined. For example, the truncation criteria may specify the most recent orders (by creation date or date modified date) associated with a particular customer.

The truncation threshold of the synchronization configuration information 164 specifies an amount of data object instances stored in the data store 156 to be sent to the client device 108. For example, the truncation limit may be a particular number of data object instances to be stored at the client device 108 (or, alternatively, to be sent to the client device 108), a size of the data object instances (such as 100 megabytes) to be stored at the client device 108 (or, alternatively, to be sent to the client device 108), a size based on the storage capacity of the client device 108 (such as 10% of the storage capacity), or some other limitation. The download processor 160 determines data object instances stored in the data store 156 meeting the truncation criteria, and within the truncation threshold, and sends them to the client device 108. For example, the download processor 160 may analyze data or metadata associated with the data object instances. In some cases, all relevant data object instances are sent to the client device 108 because the truncation threshold is not reached. In other cases, only some of the relevant data objects are sent to the client device 108, because the truncation threshold is reached.

During the truncated synchronization, the remote computing system 114 can skip sending a data object instance that the client device 108 already stores, if that data object instance has not been changed since the last synchronization (i.e., the client device 108 already has the current version of the data object instance). For example, the download processor 160 determines which data object instances are already stored at the client device 108 (in their most current form) and only sends data object instances that are not already available at the client device 108. A data object instance may be considered unavailable at the client device 108 if no version of the data object instance is stored at the client device 108, or if the stored version is outdated. In some implementations, the remote computing system 114 maintains a record of the last synchronization with the client device 108 in order to determine what data object instances should be sent. Depending on implementation, the truncation threshold can be expressed and enforced in terms of capabilities (e.g., available storage) of the client device 108 or in terms of amounts to be transferred.

The client device 108 and remote computing system 114 can exchange information during the synchronization process to determine whether a particular data object instance should be sent. For example, each data object instance may be provided with an identifier, or key, that identifies a data object instance, including its version. If the data object instance exists on the client device 108, and has the same identifier as the version of the data object instance at the remote computing system 114, it can be determined that the data object instance need not be sent. If the identifier of the data object instance on the local client device 108 indicates that the data object instance was changed on the client device 108, the data object instance can be sent by the client device 108 to the remote computing system 114 and, optionally, synchronized with the data object instance version maintained at the remote computing system 114 in the data store 156. Whether the changed version is retained at the client device 108 can be determined as described above using the download processor 160, according to the truncation criteria.

In other implementations, the synchronization is carried out without considering what data object instances are already stored at the client device 108. For example, the client device 108 may simply overwrite the data store 138 (or a relevant portion thereof) with the data received from the remote computing system 114.

Information stored at the client device 108 or the remote computing system 114, including in the database 126 of the client device 108 or the database 144 of the remote computing system 114, can be stored in encrypted form or unencrypted form in memory, a storage device, or a combination of the two. The memory can be tangible memory, such as volatile memory (e.g., registers, cache, RAM), non-volatile memory (e.g., ROM, EEPROM, flash memory, etc.), or some combination of the two, accessible by the client device 108 or the remote computing system 114. The storage can be removable or non-removable, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the client device 108 or the remote computing system 114.

The client device 108 and/or remote computing system 114 can include a scheduling component for determining whether it is time to synchronize (or otherwise update) information in the database 126 of the client device 108 with information in the database 144 of the remote computing system 114. For example, the scheduling component can compare the current day of the week, date, and time to a time and interval specified in an update schedule. If the current time matches the time and interval specified in the update schedule, the disclosed synchronization/download process can be initiated. As a specific example, a current date and time of Monday, January 1 at 6:00 a.m., can match a daily scheduled update for 6:00 a.m., or a weekly scheduled update for Mondays at 6:00 a.m., or a monthly scheduled update for the first of each month at 6:00 a.m. The scheduling component can execute as part of the client application 120, or the scheduling component can run as a background process or daemon so that synchronization/downloading can take place even if the client application 120 is not currently executing. For example, the scheduling component can be started as a daemon executing on the client device 108 when the synchronization configuration information 164 is created or modified.

In other implementations, synchronization is initiated in a different way, such as in response to user action on the client device 108. For example, a user may specifically request synchronization, or synchronization may occur as part of other user-initiated actions, such as a query. For example, user input in viewing, searching, or modifying data may result in relevant data object instances being sent to the client device 108 from the remote computing system 114, such as to enable the user to access the data object and its instances in an offline mode.

It should be appreciated that the client device 108 and the remote computing system 114 may be configured differently. For example, the client device 108 and the remote computing system 114 need not include a discrete database 126, 144. Also, the data and metadata associated with a data object instance may be stored in a different manner.

In addition, the handling of actions through the user interface 120 may differ depending on whether the client device 108 is operating in online or offline mode. For example, when in offline mode, metadata in the metadata store 128 may be interpreted entirely in the client application 120 (other otherwise locally to the client device 108), with the client device 108 only accessing data in the data store 138 of the client device 108. When in online mode, interpreting can occur both on the remote computing system 114 and on the local computing device 108, such as in the client application 120, such as using communications over the network 116, with the client device 108 accessing data in the data store 156 of the remote computing system 114.

Example 2—Example Screen for Data Object Display at a Client Device

Figure 2:
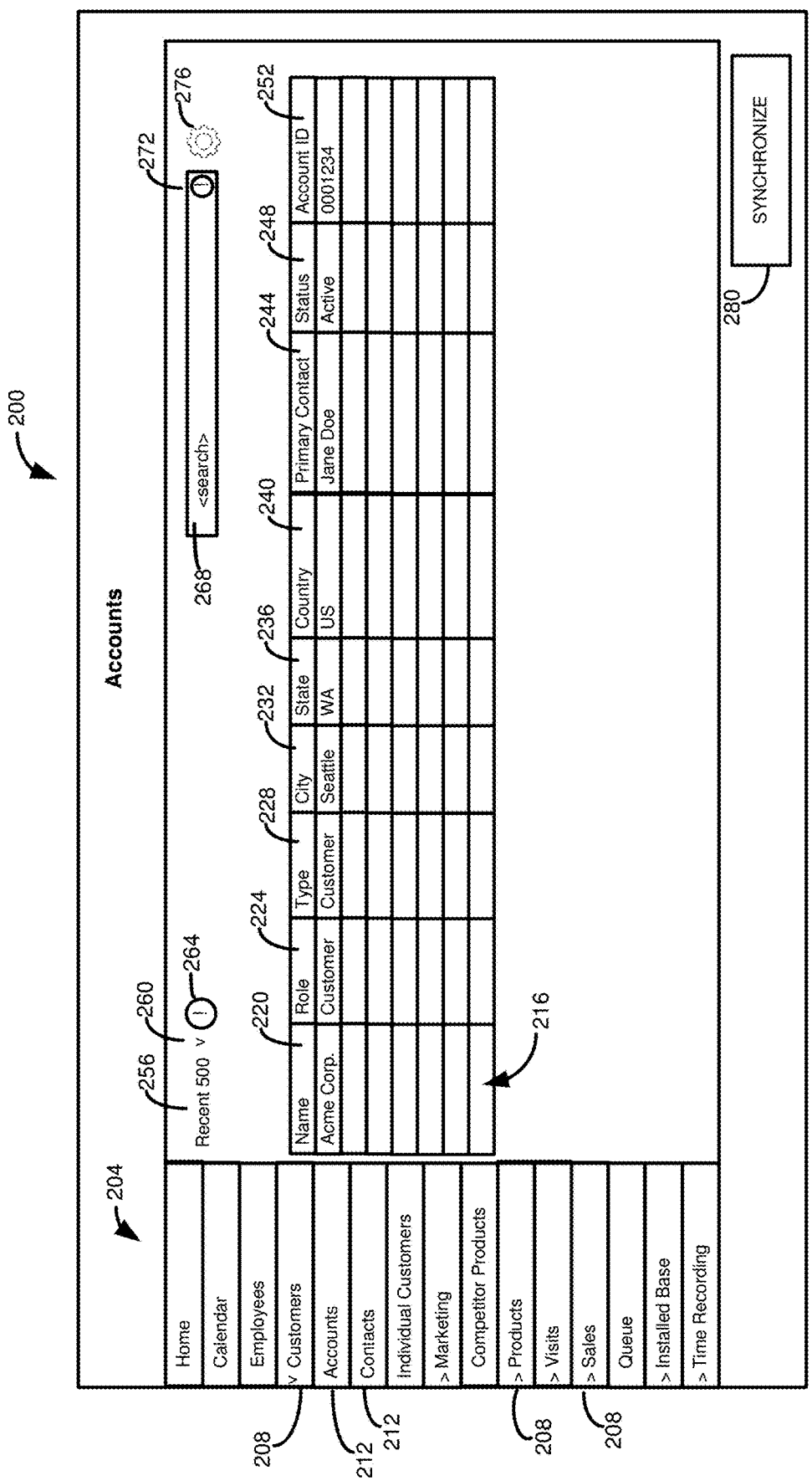
FIG. 2 is a diagram of an example screen of a client device for displaying data object instances of one or more data object schemas.

FIG. 2 is a diagram of an example screen 200 for a user to view data objects, including data object instances. For example, the screen 200 can be displayed on a display screen of the client device 108 in response to user input on the client device 108 of FIG. 1, and can be implemented using the user interface 122, the client application 120, and, at least in some implementations and circumstances, resources of the remote computing system 114.

The screen 200 includes a navigation menu 204 that includes various tasks 208 that a user can select, which can include visualizations of one or more data object schemas 212. For example, the screen 200 displays data objects having the type "account." An "account" may represent a sales account in a particular implementation, but could represent other types of accounts, such as vendor accounts.

The screen 200 includes data fields 216 representing various values stored in metadata or data associated with particular instances of the account data object schema. In the example of FIG. 2, the screen 200 displays values for multiple instances of the account data object schema, for fields that include the name 220 of the account, the role 224 of the account (such as customer or vendor), the type 228 of the account (such as residential, commercial, wholesale, retail, etc.), the city 232, state 236, and country 240 associated with the account, a primary contact 244 at the account, a status 248 associated with the account (such as active, closed, delinquent, current, etc.), and an account ID 252 associated with the account. The fields 216 can include more or fewer fields, as desired, and as defined according to a particular data object schema.

The screen 200 includes a field 256 that identifies the subset of the data object instances currently being displayed. For example, the field 256 in FIG. 2 indicates that the data object instances shown represent the most recent 500 instances of the data object schema. A selectable object 260 may be included to allow a user to change the data object instances shown on the screen 200. For example, rather than the most recent 500 instances of all accounts, a user may choose different display criteria, such as a number instances associated with the highest sales volume.

A visual indicator 264 is provided that indicates to a user that the data object instances displayed (or available for display on the local device) are less than a number of potentially relevant data object instances maintained at a remote computing system. That is, the visual indicator 264 can be used to indicate to the user that the synchronization configuration information of the remote computing system has been applied and data received by the client device has been truncated. The visual indicator 264 may not appear when the data received has not been truncated, such as when the number of relevant data object instances at the remote computing system is less than the truncation threshold. In some implementations, the visual indicator 264 is omitted, such as even if the data received has been truncated.

The screen 200 further includes a search field 268, where a user may enter a query to be run against the data object instances on the local client device, in offline mode, or on data object instances at the remote computing system, in online mode. The search field 268 optionally includes a visual indicator 272 that the query will be run against a data set that is less the number of potentially relevant data object instances maintained at a remote computing system.

A selectable object 276 may be provided to allow a user to access various settings of the client device. For example, the selectable object 276 may allow a user to access settings related to synchronization, such as creating, modifying, or deleting synchronization settings, including, in some examples, synchronization configuration information.

A selectable object 280 may be provided to allow a user to manually synchronize the client device with a remote computing system. In other implementations, the selectable object 280 is omitted and synchronization is initiated in another manner, such as at defined intervals, in response to a synchronization request from the remote computing system, or in response to other user action, such as a query.

Example 3—Example Synchronization Configuration Settings

Figure 3:
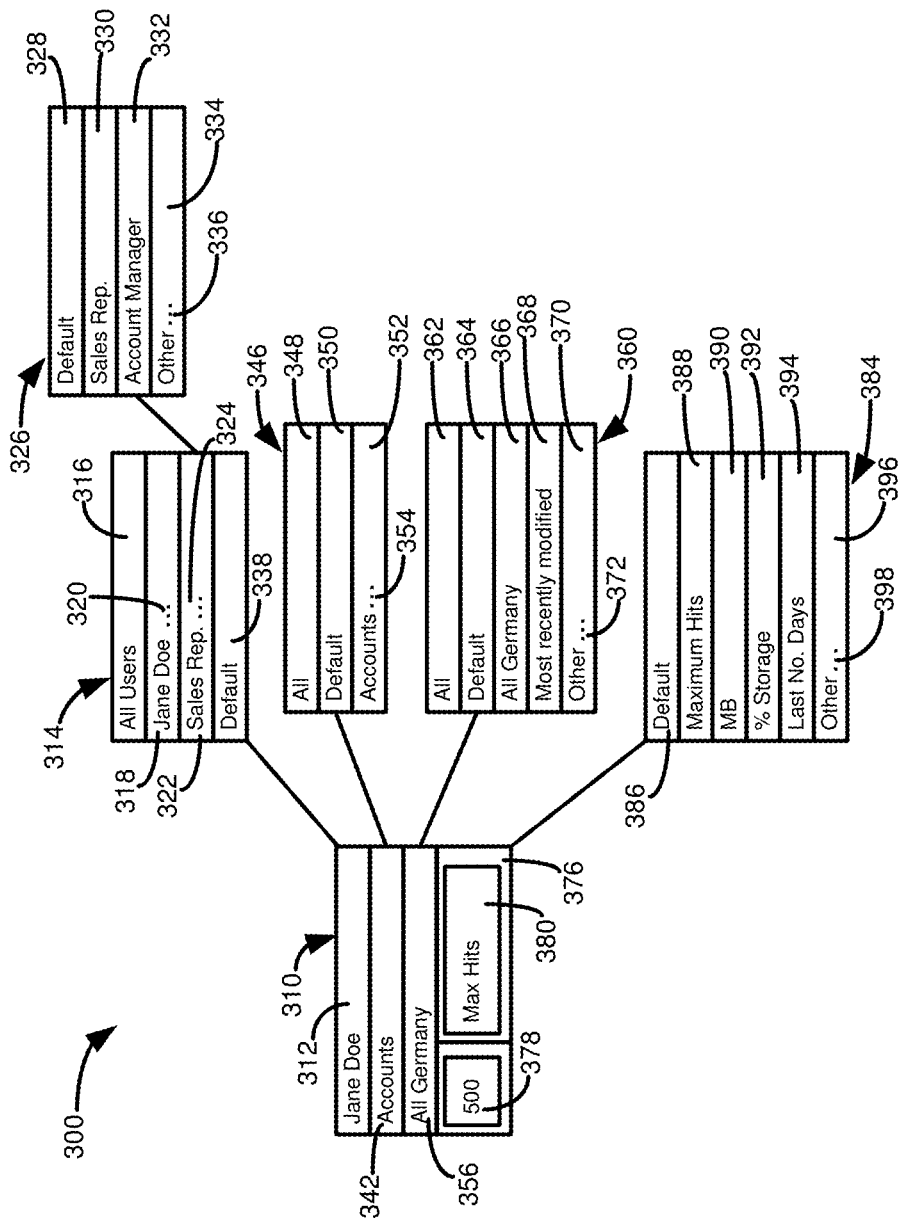
FIG. 3 is a diagram of a menu tree that may be used to specify a synchronization role.

FIG. 3 is a diagram of a menu tree 300 illustrating various options that may be selected in setting synchronization configuration information, including one or more synchronization rules of the synchronization configuration information. A base menu 310 may include a user field 312 that applies the synchronization rule (or configuration) to one or more users. By selecting the user field 312, a user (such as an end user at the client device or a user, such as an administrator, of the remote computing system) may select the one or more users to which the synchronization rule (or configuration) will apply. For example, user sub-menu 314 includes an option 316 to apply the synchronization rule to all users and an option 318 to apply the synchronization rule to a specific user. A search icon 320 can be provided to allow a new specific user to be located and selected.

The user sub-menu 314 further includes an option 322 to apply the synchronization rule to a particular category of users. For example, the category may reflect a particular role a user plays in an organization. Users in a role at an organization may have a greater need for particular types of information than users in another role. However, each user in a particular role may have similar needs to other users in the role. For example, a sales representative may have a greater need for detailed information related to accounts serviced by the representative. An account manager may have less need for granular information on individual accounts, but may need to obtain data related to a plurality of individual sales representatives, or information summarizing various accounts. The option 322 may include a search icon 324 to allow another specific category of users to be located and selected.

A user role submenu 326, reachable through search icon 324, includes a default option 328, which may be used to apply the rules to a default set of user roles (which, in some cases, can vary depending on other parameters of the synchronization rule, such as the truncation criteria). Options 330, 332 present specific user roles, sales representative and account manager, respectively, that may be selected. These may be, for example, most recently or commonly used user roles. An option 334 is provided to allow another role to be selected by selection of a search button 336.

Returning to the user sub-menu 314, it may also include a default option 338 to apply the synchronization rule to a default set of users, which could be, for example, determined based on the user setting the synchronization criteria and/or the truncation criteria specified. For example, if an account manager were setting the synchronization rule, the default set of users might be sales representatives, or sales representatives reporting to that particular account manager.

The base menu 310 includes a data object field 342 indicating one or more data object schemas to which the synchronization rule will apply. For example, the data object field 342 is shown as being set to apply to data objects of the schema "accounts." By selecting the data object field 342, the user may call a data object field sub-menu 346.

The data object field sub-menu 346 includes an option 348 to apply the synchronization rule to all data object schemas. A default option 350 is provided that allows one or more default data object types to be selected. In some cases, the data object schemas encompassed by the default option may be determined, at least in part, by one or more of the identity of the user setting the synchronization rule, the user(s) to which the synchronization criteria will apply, any remaining truncation criteria to be selected, and the truncation threshold. For example, each user role (sales representative, account manager, etc.), may be associated with a default set of data object schemas to which a synchronization criteria will apply.

A data object field 352 of the data object field sub-menu 346 shows one (or more) data object schemas currently selected. A user may choose one or more different (or additional) data object schemas to which the synchronization rule should apply by selecting the search button 354.

A data object schema field 356 can be used to select a subset of the data object schemas to which the synchronization rule will apply, such as based on metadata associated with the data object schema. In particular examples, the subset is based on a query, such as a user-defined query. For example, FIG. 3 shows data object schema field 356 as set to display all results associated with Germany (which may be, for example, a query set to locate accounts where the "country" field is equal to Germany). In further examples, the data object schema field 356 may be used to select data object instances associated with a particular user, a particular customer, a particular geographic region, a particular contact, having a particular status, or combinations thereof.

Selecting the data object schema field 356 can be used to access a data object schema sub-menu 360. The data object schema sub-menu 360 includes an option 362 to apply the truncation criteria to all data object instances and a default option 364 to apply the truncation criteria to a default subset of data object instances. In particular implementations, the default subset may be determined at least in part, by a particular user setting the synchronization rule, the user(s) to which the synchronization rule will apply, the type of data object schema(s) selected for the synchronization configuration information, or the truncation criteria. For example, a default value might be "most recently changed data object instances" or "top 10 customers by sales."

Fields 366 and 368 list specific truncation criteria. Field 366 specifies that relevant data object instances are those having a value of "Germany," as discussed above. Field 368 specifies that relevant data object instances are those which have been most recently modified. As discussed above, multiple criteria, such as metadata associated with a data object schema, can be combined to specify truncation criteria, as in a user-defined query. The data object schema sub-menu 360 includes a field 370 that allows different/additional truncation criteria to be selected, such as through user activation of a search button 372. In a specific example, activation of the search button 372 may take a user to a screen (or sub-menu or popup menu) that allows a user to select, for example, metadata fields associated with a selected data object schema and, optionally, build factors in truncation criteria based on such fields.

The data object field 342 and data object schema field 356 are used, in particular implementations, to determine the truncation criteria of the synchronization rule. A truncation threshold field 376 is used to determine an amount of data object instances to be sent to (or received by) a client device. The truncation threshold field 376 may include a numerical (such as integer) sub-field 378 and a type sub-field 380, which is typically used to determine the type of limitation to which the numerical sub-field value will apply. As shown, the numerical sub-field 378 has a value of "500" and the type sub-field 380 has a value of "Max Hits." Thus, the truncation rule, or synchronization rule, shown in FIG. 3 is to return a maximum of 500 hits meeting the selected truncation criteria ("All Germany").

The numerical sub-field 378 may be modified by the user entering a number in the field. In some implementations, the numerical sub-field 378 can use a default value if a value is not entered, or if the entered value is outside of defined range (such as a range based on the selected truncation criteria). The user, in some examples, may be provided with a warning if the value of the numerical sub-field 378, such as the value as applied to the value of the type sub-field 380, is outside of a defined range.

A different value for the type sub-field 380 may be selected by the user selecting the type sub-field 380 to call truncation type sub-menu 384. Truncation type sub-menu 384 includes a default option 386. The default option 386 may be a single predetermined type, or may be determined based on other parameters, such as the identity of the user setting the synchronization rule, the client device being synchronized with the remote computing system, the user(s) to which the synchronization rule is being applied, the truncation criteria of the synchronization rule, and the value of the numerical sub-field 378.

The type sub-menu 384 includes a variety of predefined options that may be selected. For example, the type can be a maximum number of hits to be returned 388 (or, alternatively, to be stored at the client device), a maximum size of results (such as a size in megabytes or gigabytes) to be returned 390 (or, alternatively, to be stored at the client device), a percentage of storage 392 of the client device that should not be exceeded for storing data object instances meeting the truncation criteria, and results within a selected period of time 394, such as the most data object instances for a number of days, months, or weeks set forth in the numerical sub-field 378. The type sub-menu can further include on option 396 for selecting a different type of truncation threshold, such as through selection of a search button 398. Other types of truncation limits may be used, and the type-submenu 384 may include more or fewer options.

Example 4—Example Synchronization Configuration Display Screen

Figure 4:
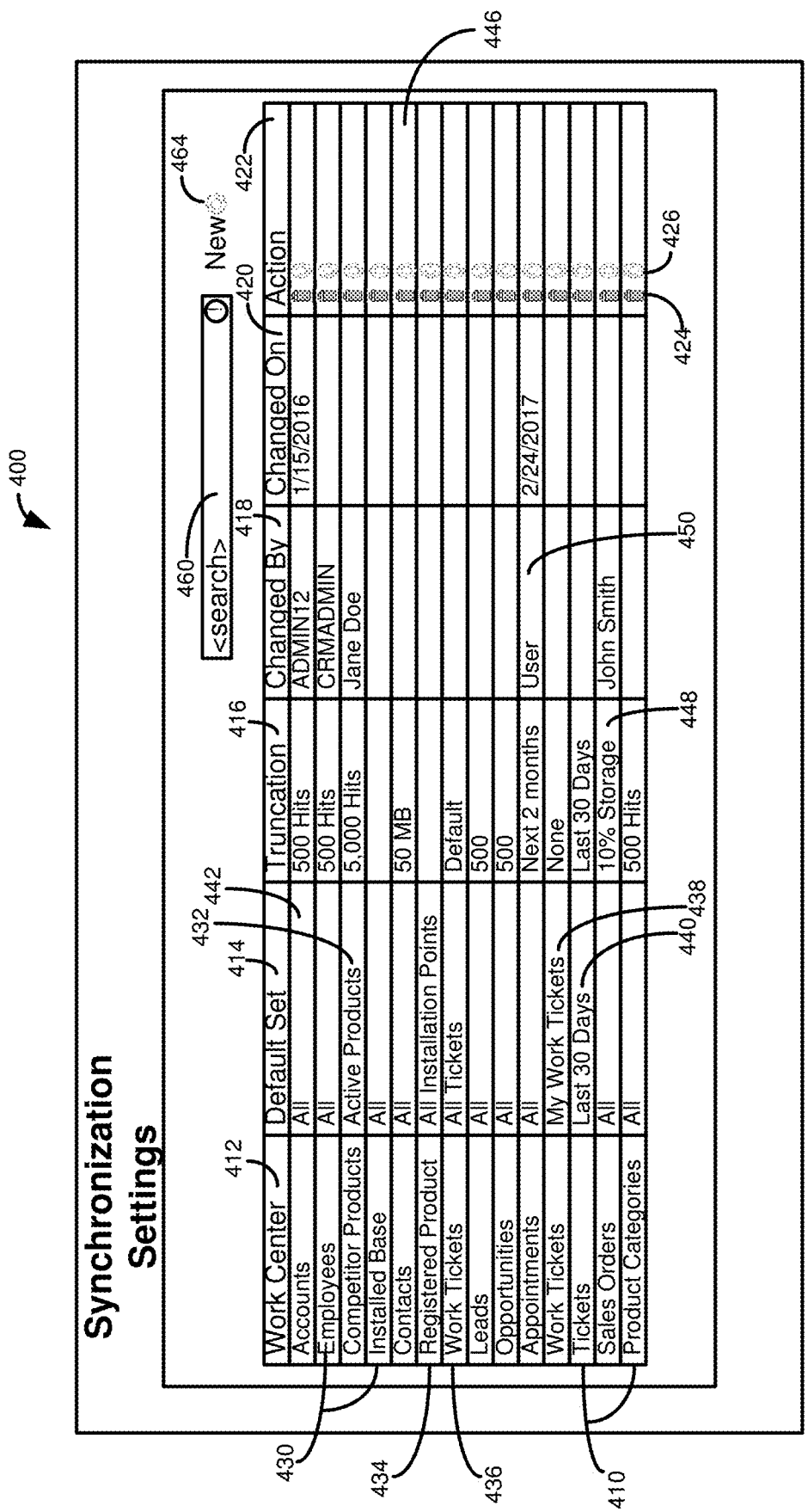
FIG. 4 is a diagram of an example screen for displaying synchronization rules for different data object schemas.

FIG. 4 is a diagram of an example screen 400 providing a view of various synchronization rules 410 associated with synchronization configuration information. The synchronization rules 410 may be, for example, synchronization rules associated with a particular user, or a particular group of users (such as users having a specific role).

The screen 400 displays various properties associated with each of the synchronization rules 410, such as the work center 412 (which can represent, for example, a particular type of data object schema), a default subset 414 of the data object schema to which the synchronization rule applies, the truncation threshold 416, the identity 418 of a user 418 who entered or last changed the synchronization rule, the date 420 the synchronization rule was created or modified, and actions 422 that may be taken for the synchronization rule. For example, actions may include deleting the synchronization rule by selecting the delete icon 424 or modifying the settings for the synchronization rule by selecting the settings icon 426.

The screen 400 shows that synchronization rules 410 can have different settings for different work center/data object schemas 412. While some data object schemas 430 have a default set value 414 of "all", data object types 432, 434, 436, 438, 440 have different values. For example, data object type 432, for "Competitor Products," has a default set value of "Active Products" (which may exclude, for example, products that are no longer active). The synchronization rule 434 for data objects of type "Registered Products" is applied to "All Installation Points." The "Work Tickets" data object type has a synchronization rule 436 that is applied to "All Tickets," while another synchronization rule 438 for "Work Tickets" is applied to "My Work Tickets," which may be, for example, work tickets associated with a specific user to which the synchronization rule 438 is applied. A synchronization rule 440 for data objects of type "Tickets" is applied to instances created within the last 30 days.

The screen 400 also shows that different synchronization rules 410 can have different truncation types and limits. For example, while synchronization rules 442, 432 use a maximum number of hits as the truncation type, synchronization rule 442 allows 500 data object instances to be synchronized, while synchronization rule 432 allows 5,000 data object instances to be synchronized. Rather than number of hits, synchronization rule 446 specifies a maximum size, 50 MB, of data object instances that may be sent to the client device. Similarly, synchronization rule 448 specifies a maximum percentage (10%) of local device storage that may be used to store data object instances otherwise meeting criteria of the synchronization rule 448.

As illustrated by synchronization rules 440, 450, dates may also be used as a truncation type. Synchronization rule 440 specifies that "Tickets" data object instances from within the last 30 days may be synchronized, while synchronization rule 450 specifies that "Appointments" data object instances for the next 2 months may be synchronized.

Synchronization rule 436 illustrates that a synchronization rule may be assigned a default value, while synchronization rule 438 illustrates that some data object schemas may be specified as explicitly not being subject to a truncation threshold.

The "changed by" property 418 of the screen 400 illustrates that changes may be made by a variety of users. For example, synchronization rule 442 is shown as being changed (or added) by an administrator, while synchronization rule 450 indicates that it was changed (or added) by a user, such as the user of the client device, and to whom the synchronization rule 450 applies. Synchronization rule 432 lists the name of a specific individual, who, in various examples, may be the end user, an administrator, or another individual authorized to add/modify synchronization rules.

Screen 400 can include a search field 460, which can be useful when there are large number of synchronization rules 410. In addition, the screen 400 can include an icon 464 that, when selected, allows a user to access various settings related to the respective synchronization configuration rules 410, such as to add a new synchronization configuration or rule.

Figure 5:
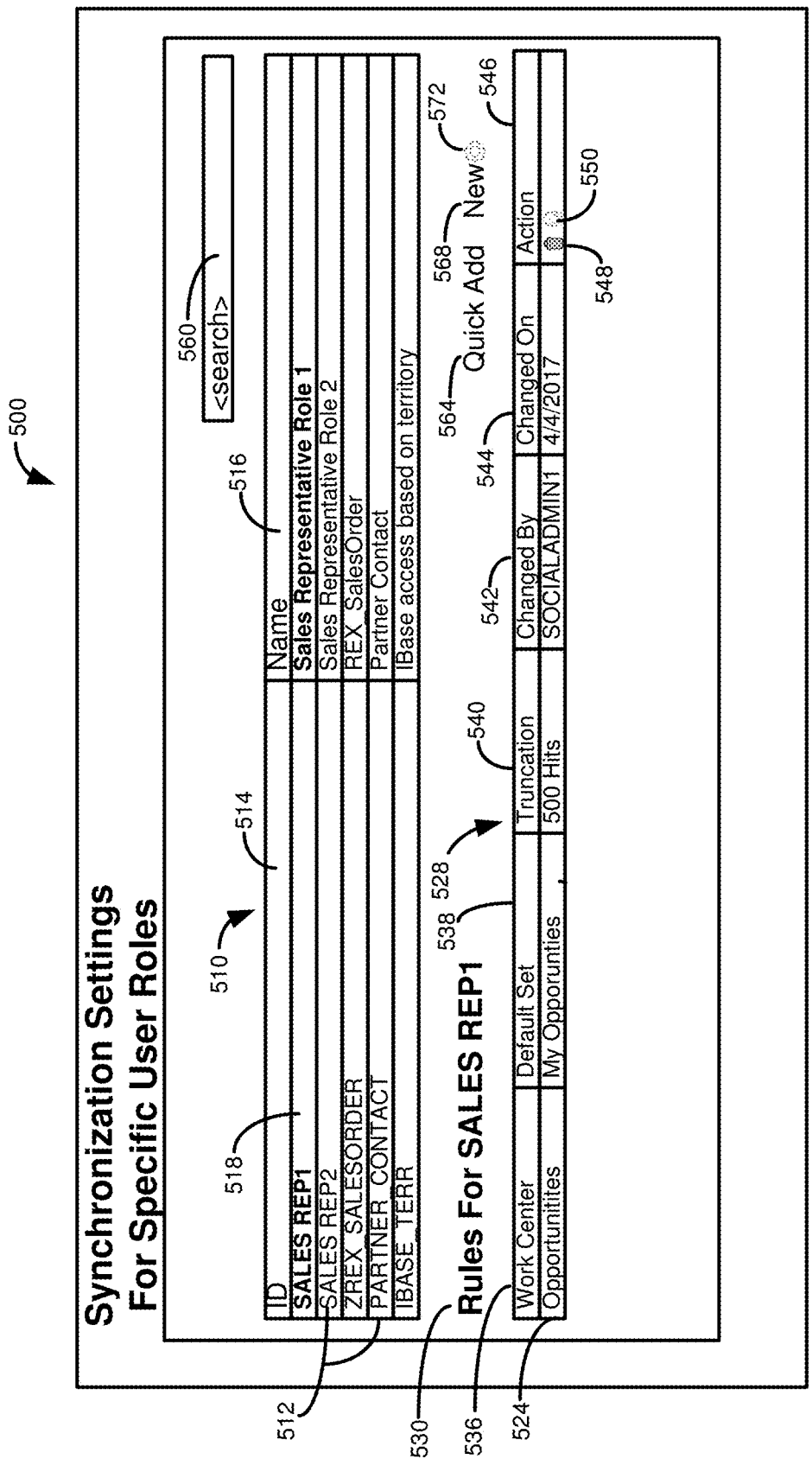
FIG. 5 is a diagram of an example screen for displaying synchronization configuration information associated with specific user roles.

Example 5—Example Screen for Viewing and Specifying Synchronization Configuration Information for Specific User Roles FIG. 5 is a diagram of an example screen 500 providing a view of synchronization configuration information associated with specific user roles, such as the role of a user within an organization (for example, sales representative, account manager, etc.). The screen 500 includes a list 510 of various user roles 512. For each user role 512, the list 510 provides information regarding an ID 514 for the role (which may be a shorthand way of referring to the role, for example) and the name of the role 516. When a user selects a particular user role 514, such as role 518, information about one or more synchronization rules 524 associated with the synchronization configuration information for the role 518 may be provided in synchronization rule list 528. The screen 500 may update a title 530 above the synchronization rule list 528 to help indicate the role for which synchronization configuration information is being displayed.

The synchronization rule list 528 displays various properties associated with the synchronization rule 524, such as for work center (which can represent a data object schema) 536, a default set 538 of the work center/data object schema to which the synchronization rule should apply, truncation criteria 540, a changed by field 542, a changed on date field 544, and an action field 546, which can include icons 548, 550 allowing a user to delete or edit, respectively, the synchronization rule. In at least certain aspects, these properties are as described above regarding the screen 400 of FIG. 4.

The screen 500 also includes a search field 560, where a user can query user roles and/or synchronization configuration information or rules associated with a specific user role. A quick add icon 564 may be included, allowing a user to create a new synchronization rule for the selected user role 518. For example, selection of the quick add icon 564 may auto populate certain properties of the synchronization rule list 528, or providing relevant options from which a user may select. An "add" or "new" icon 568 may be provided, from which a user may manually define new synchronization configuration information, such as synchronization configuration information for a different user role than the selected user role 518. A settings icon 572 can allow a user to access various synchronization settings, such as viewing or modifying synchronization configuration information or rules other than by user role.

Example 6—Synchronization Actions at a Remote Computing System

Figure 6:
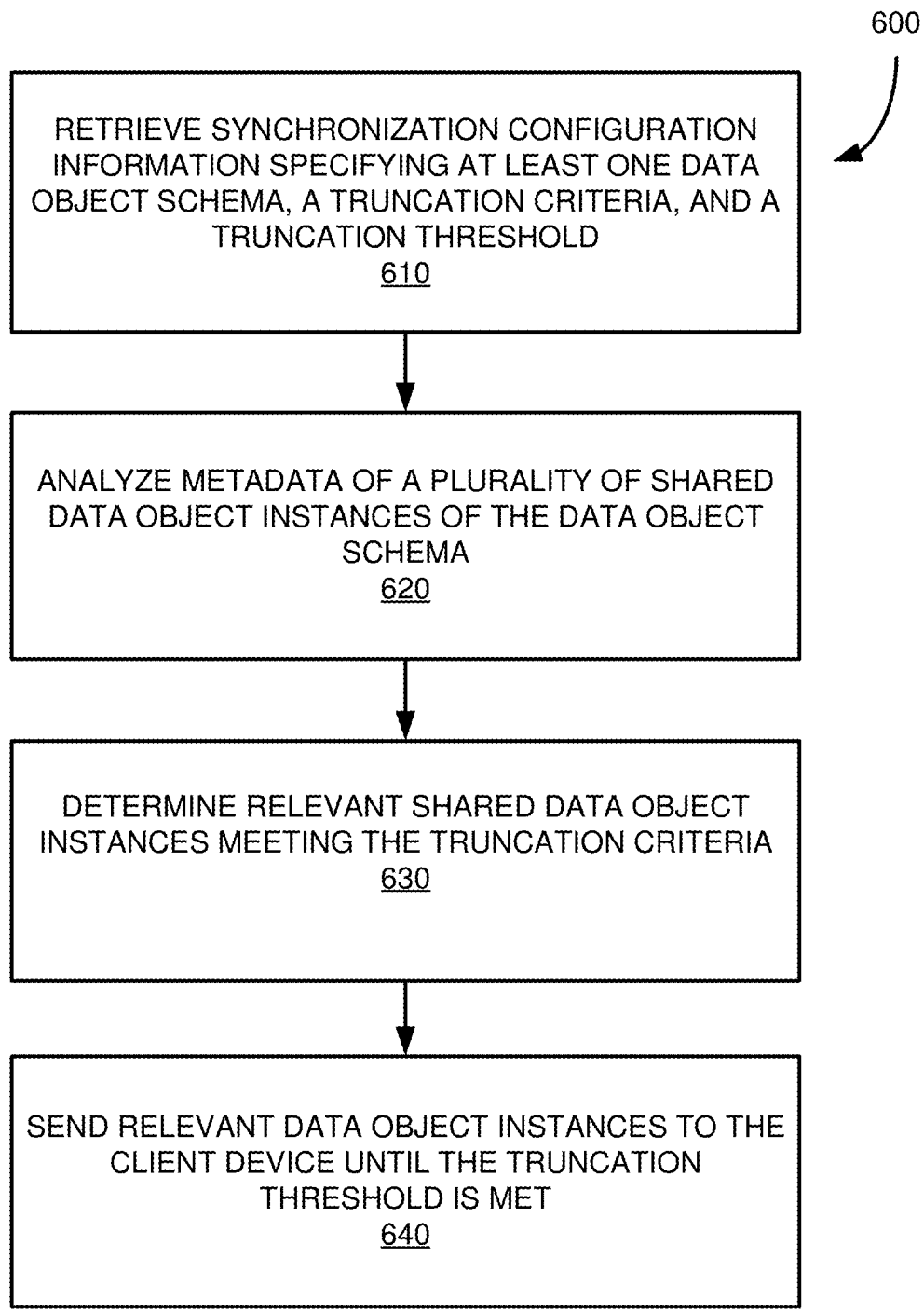
FIG. 6 is a flowchart of actions occurring at a remote computing system during synchronization with a client device according to an embodiment of a synchronization protocol of the present disclosure.

FIG. 6 is a flowchart of an example method 600 of actions occurring at a remote computing system during synchronization of data object instances, such as shared data object instances, of a data object schema with a client device, for offline use at the client device. In particular implementations, the data object schema is specified in a markup language, such as XML. In step 610, the remote computing system retrieves synchronization configuration information, which may be associated with the client device and/or associated with the user. The synchronization configuration information can include one or more synchronization rules, each of which can include truncation criteria and a truncation threshold. Each synchronization rule specifies at least one data object schema (which can include, for example, user interface metadata and data object metadata for a data object).

In some implementations, the truncation criteria are specified in terms of data object schema metadata. For example, the truncation criteria may include a last-changed date associated with data object instances of the data object schema. The truncation threshold specifies a maximum amount of data object instances meeting the truncation criteria that may be sent to the client device during a given synchronization task. The truncation threshold may be, for example, a maximum number of data object instances that may be sent to the client device during the synchronization task, a maximum amount (such as size in bytes) of data object instances that may be sent to the client device during the synchronization task, a maximum number of data object instances that the client device may store, a maximum amount of storage that may be used on the client device, or data object instances created or modified over a particular time period.

In step 620, the remote computing system analyzes metadata of a plurality of data object instances (such as shared data object instances) of the data object schema. The remote computing system determines, in step 630, relevant shared data object instances of the plurality of shared data object instances of the data object schema meeting the truncation criteria. For example, the remote computing system may determine whether metadata of each of the plurality of shared data object instances satisfies the truncation criteria. In some scenarios, it may be determined whether a data object instance has a most-recent changed date. In some implementations, the determining in step 630 can include sorting a table, such as database table stored in the remote computing system, by the truncation criteria, such as last-modified date.

Relevant data object instances are sent, such as using the HTTP protocol, to the client device in step 640 until the truncation threshold is met. In some cases, as part of step 640, all relevant data object instances are sent because the truncation threshold is not reached. In other cases, as part of step 640, only some of the relevant data objects are sent, because the truncation threshold is reached. In any case, as part of step 640, the remote computing system can skip sending a data object instance that the client device already stores, if that data object instance has not been changed since the last synchronization (i.e., the client device already has the current version of the data object instance).

The method 600 can include additional steps. For example, the method 600 can include receiving user input, such as from the client device or another remote computing system, specifying synchronization configuration information (or a synchronization rule thereof), including the truncation criteria and the truncation threshold. The synchronization configuration information (or synchronization rule), in particular examples, includes a user category to which the synchronization configuration information (or rule) will apply. The retrieving of the synchronization configuration information in step 610 can include determining a user category associated with the client device or user (for example, by examining credentials associated with the client device and/or synchronization request).

The remote computing system may store a first synchronization configuration profile for a first user category and a second synchronization configuration profile for a second user category, where the first and second synchronization configuration profiles have synchronization rules with different truncation thresholds. In particular examples, a synchronization rule of the first synchronization configuration profile and a synchronization rule of the second synchronization configuration profile only differ in their truncation thresholds. The method 600 may also include the steps of setting the first and second synchronization configuration profiles, or rules.

In another implementation, the method 600 includes sending metadata regarding the data object schema to the client device. The metadata, in some examples, relates to attributes, properties, etc. of data object instances within the data object schema. The remote computing system may also receive from the client device a request for data object instances (such as shared data object instances) of the data object schema. In response to the request, and based at least in part on the synchronization configuration information, the remote computing system may initiate a query on a user interface component of the data object schema. In further examples, the remote computing system adds the truncation criteria (from the synchronization configuration information) to the query, and the analyzing of step 620 and the determining of 630 include executing the query at the remote computing system.

In another aspect of the method 600, determining relevant shared data object instances of the plurality of shared data object instances of the data object schema in step 630 includes retrieving identifiers, such as an ID or key value, for each of the relevant data object instances that meet the truncation criteria. The method 600 can then further including using the identifiers to retrieve data object instance data associated with each of the identifiers. Step 640 may include sending the data object instance data to the client device.

In a further aspect, a user may define a new data object schema. Synchronization configuration information for the data object schema can include metadata corresponding to the truncation criteria of a synchronization rule. A user may define a new synchronization rule that uses the same truncation criteria and/or truncation threshold as an existing synchronization rule.

The method 600, in another implementation, includes updating metadata for one or more shared data object instances. For example, the method 600 includes updating last-changed data metadata associated with a first shared data object instance of the plurality of shared data objects to reflect a change made to the first data object. For example, the shared data object instance may be modified by a user other than a user of the client device.

Example 7—Synchronization Actions at a Local Device

Figure 7:
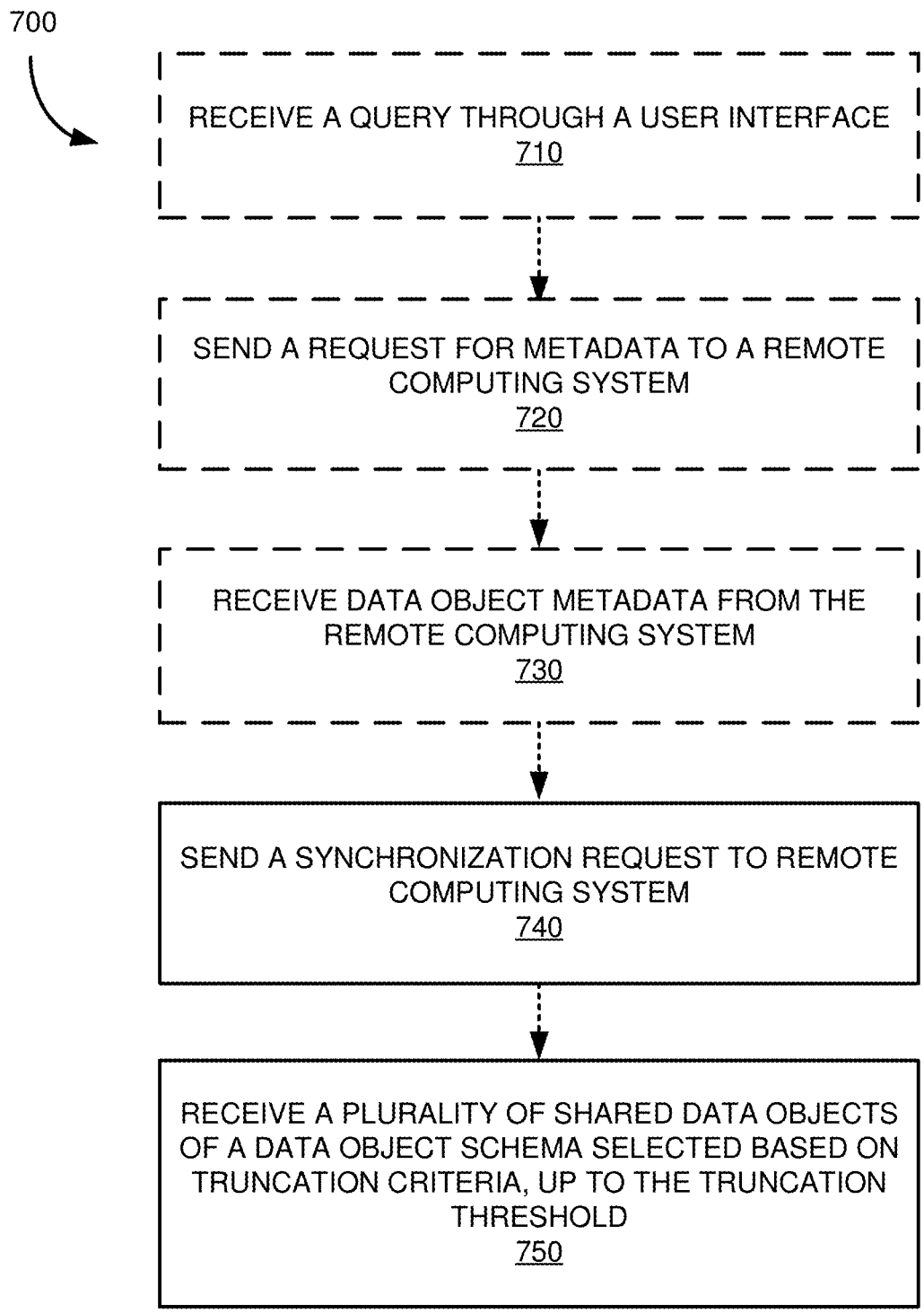
FIG. 7 is a flowchart of actions occurring at a client device during synchronization with a remote computing system according to an embodiment of a synchronization protocol of the present disclosure.

FIG. 7 is a flowchart of an example method 700 of actions occurring at a client device during synchronization of data object instances, such as shared data object instances, of a data object schema with a remote computing system, for offline use at the client device. In particular implementations, the data object schema is specified in a markup language, such as XML.

In optional step 710, the client device receives a query, such as a user query received through a user interface. In specific implementations, the user interface is specified in the data object schema and presented using a user interface modeling framework at the client device.

The local client device, in optional step 720, sends a request to the remote computing system, such as an HTTP request, for metadata associated with the data object schema. In optional step 730, the client device receives data object metadata associated with data object schema from the remote computing system. The data object metadata may relate to the data object schema or data object instances of the data object schema.

The local client device sends a synchronization request to the remote computing system in step 740. The request may include a request for data relating to data object instances meeting truncation criteria (according to a synchronization rule of the synchronization configuration information applied by the remote computing system).

In step 750, the client device receives from the remote computing system a plurality of data objects instances, such as shared data object instances, of the data object schema. The data objects instances are selected at the remote computing system according to synchronization configuration information that includes a synchronization rule having truncation criteria and a truncation threshold. The shared data object instances are received until the truncation threshold is met. Thus, the plurality of data object instances does not exceed the truncation threshold, such as being less than the truncation threshold.

The method 700 may include additional steps. For example, the user may be provided with a visual indication that the received shared data object instances were truncated. For example, the visual indication may indicate that the number of data object instances received from the remote computing system is less than a total number of potentially relevant data object instances (meeting the truncation criteria) available at the remote computing system.

In another example, the method 700 includes receiving user input defining synchronization configuration information or a synchronization rule, and sending the synchronization configuration information or rule to the remote computing system. For example, the client device presents a configuration menu on a display of the client device. The configuration menu can include a first field for truncation criteria of a rule and a second field for a truncation threshold of the rule. The client device receives user input that specifies one or more of the truncation criteria and the truncation threshold of the rule. Then, the client device sends synchronization configuration information to the remote computing system, indicating the truncation criteria and the truncation threshold of the rule.

Example 8—Representative Computing Environment

Figure 8:
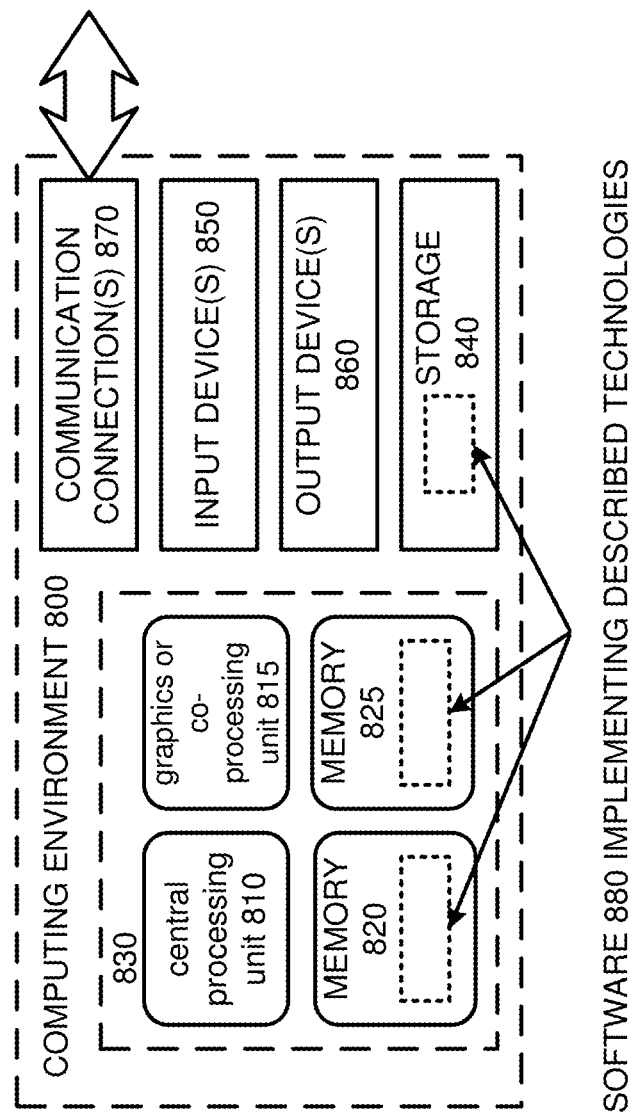
FIG. 8 is a diagram of an example computing system in which described embodiments can be implemented.

FIG. 8 depicts a generalized example of a suitable computing environment (e.g., computing system) 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer(s), tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity, which may also be configured as described in this Example 8. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Example 9—Cloud-Supported Environment

Figure 9:
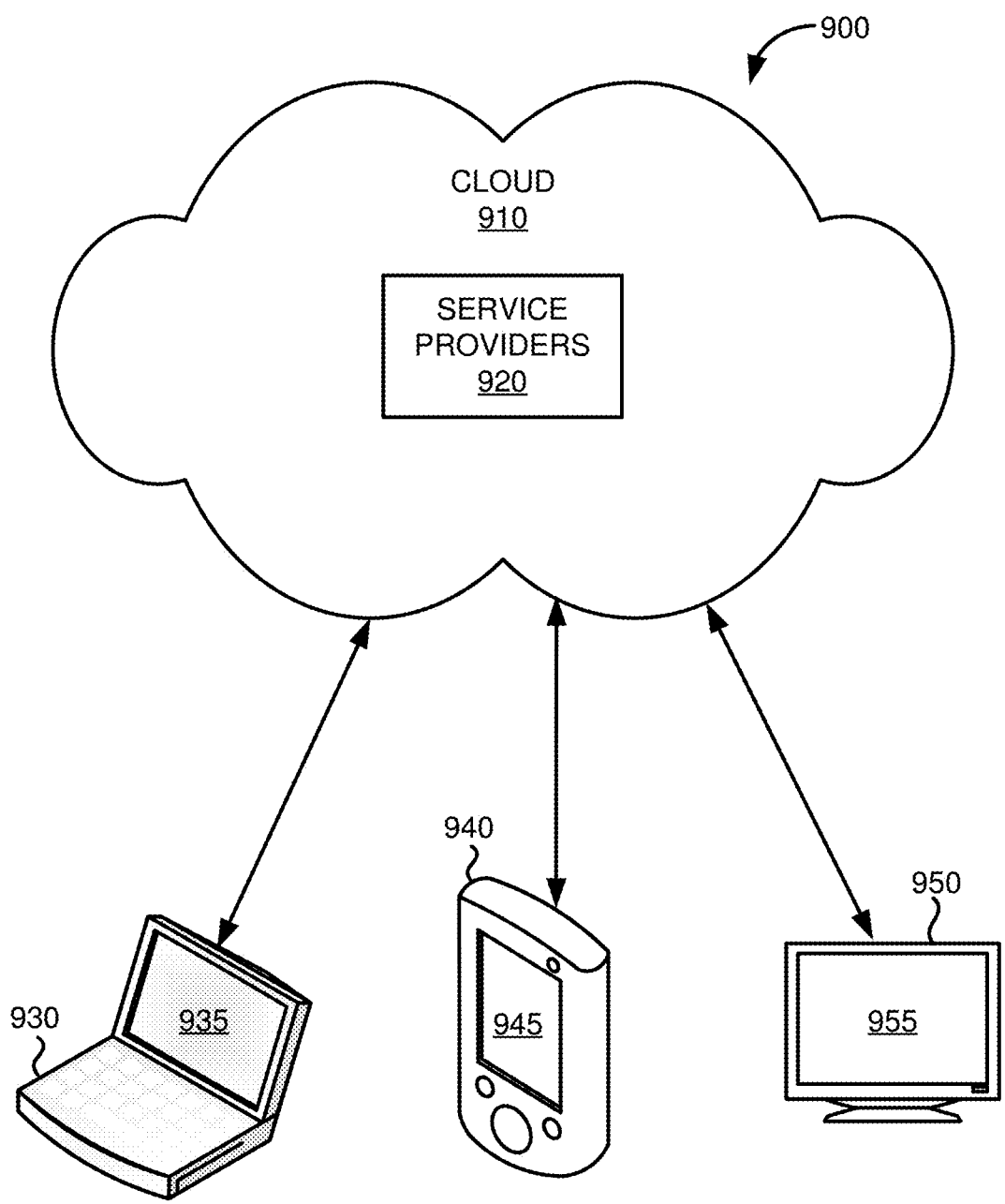
FIG. 9 is an example cloud-support environment that can be used in conjunction with the technologies described herein.

FIG. 9 is an example cloud-support environment that can be used in conjunction with the technologies described herein. In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through cloud service providers 920, or through other providers of online services (not depicted). For example, cloud services can be customized to the screen size, display capability, and/or touch screen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of computing languages, including programming languages, markup languages, or combinations thereof.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. One or more non-transitory computer-readable media comprising computer-executable instructions for causing a remote computing system to perform operations to synchronize shared data object instances between the remote computing system and a client device for offline use at the client device, the operations comprising:
retrieving synchronization configuration information, the synchronization configuration information comprising:
a first synchronization rule specifying a first data object schema to which the first synchronization rule will apply, a first criterion to be applied in selecting which shared data object instances of the first data object schema to send to the client device during a synchronization task, and a first threshold specifying a maximum amount of shared data object instances of the first data object schema that may be sent to the client device during the synchronization task, wherein the first data object schema comprises a first plurality of data members, wherein respective shared data object instances of the first data object schema comprise values for the first plurality of data members as well as metadata associated with the shared data object instance, and wherein the first criterion is a particular value for one of the first plurality of data members; and
a second synchronization rule specifying a second data object schema to which the second synchronization rule will apply, a second criterion to be applied in selecting which shared data object instances of the second data object schema to send to the client device during the synchronization task, and a second threshold specifying a maximum amount of shared data object instances of the second data object schema that may be sent to the client device during the synchronization task, wherein the second data object schema comprises a second plurality of data members, at least a portion of the second plurality of data members being different than the first plurality of data members, wherein respective shared data object instances of the second data object schema comprise values for the second plurality of data members as well as metadata associated with the shared data object instance;

analyzing a plurality of shared data object instances of the first data object schema;

determining which of the plurality of shared data object instances of the first data object schema meet the first criterion, including determining which of the plurality of shared data object instances of the first data object schema comprise said particular value for said one of the first plurality of data members;

determining which of the plurality of shared data object instances of the second data object schema meet the second criterion;

sending the shared data object instances of the first data object schema that meet the first criterion to the client device until the first threshold is met; and sending the shared data object instances of the second data object schema that meet the second criterion to the client device until the second threshold is met.

2. The one or more non-transitory computer-readable media of claim 1, the operations further comprising setting synchronization configuration information for a user category, wherein retrieving synchronization configuration information comprises determining a user category associated with the client device or user.

3. The one or more non-transitory computer-readable media of claim 1, the operations further comprising:
sending metadata regarding the first data object schema to the client device; and
receiving from the client device a request for shared data object instances of the first data object schema.

4. The one or more non-transitory computer-readable media of claim 3, wherein the operations further comprise:
in response to the request and based at least in part on the synchronization configuration information, initiating a query on a user interface component of the first data object schema.

5. The one or more non-transitory computer-readable storage media of claim 4, the operations further comprising adding the first criterion to the query.

6. The one or more non-transitory computer-readable media of claim 1, the operations further comprising retrieving identifiers for each of the shared data object instances of the first data object schema that meet the first criterion, and retrieving data object instance data associated with each of the identifiers.

7. The one or more non-transitory computer-readable media of claim 1, the synchronization configuration information further comprising:
a first synchronization configuration profile for a first user category, the first synchronization configuration profile comprising a third threshold specifying a maximum amount of shared data object instances of the first data object schema that may be sent to the client device during the synchronization task, which can be the first threshold; and
a second synchronization configuration profile for a second user category, the second synchronization configuration profile comprising a fourth threshold specifying a maximum amount of shared data object instances of the first data object schema that may be sent to the client device during the synchronization task, which is different than the third threshold.

8. The one or more non-transitory computer-readable media of claim 1, the operations further comprising updating last changed date metadata associated with a first shared data object instance of the plurality of shared data object instances of the first data object schema to reflect a change made to the first shared data object instance.

9. The one or more non-transitory computer-readable media of claim 1, the operations further comprising receiving user input defining the first criterion and the first threshold.

10. The one or more non-transitory computer-readable media of claim 1, wherein the second criterion is a particular value of a metadata attribute of the metadata.

11. The one or more non-transitory computer-readable media of claim 10, wherein the second criterion is a date that a shared data object instance was last changed, and wherein determining which of the plurality of shared data object instances of the second data object schema meet the second criterion further comprises determining which of the plurality of shared data object instances of the second data object schema have the most recent change date.

12. The one or more non-transitory computer-readable media of claim 1, wherein the synchronization configuration information further comprises one or more of:
a third synchronization rule that can be applied to a plurality of data object schemas; and
a fourth synchronization rule that can be applied to all data object schemas.

13. The one or more non-transitory computer-readable media of claim 1, wherein the second criterion is a particular value for one of the second plurality of data members, and wherein determining which of the plurality of shared data object instances of the second data object schema meet the second criterion includes determining which of the plurality of shared data object instances of the second data object schema comprise said particular value for said one of the second plurality of data members.

14. In a computing system, a method of synchronizing shared data object instances shared between a remote computing system and a client device for offline use at the client device, the method comprising, at the client device:
sending a synchronization request to a remote computing system, wherein the synchronization request is a request to the remote computing system for shared data object instances of a data object schema that meet criteria associated with a synchronization rule for the data object schema; and
receiving one or more shared data object instances of the data object schema that meet the criteria, wherein the data object schema defines a type of data object and includes a plurality of data members, wherein the respective shared data object instances comprise values for the plurality of data members as well as metadata associated with the overall shared data object instance rather than an individual data member, wherein the criteria comprise one or more particular values for at least one data member of the plurality of data members and one or more particular values for at least one metadata attribute of the metadata, and wherein the shared data object instances are received until a threshold of the synchronization rule is met, the threshold specifying a maximum amount of shared data object instances of the data object schema that may be sent to the client device during a synchronization task.

15. The method of claim 14, further comprising providing a visual indication that the received shared data object instances are less than a total number of shared data object instances that meet the criteria on the remote computing system.

16. The method of claim 14, further comprising:
sending a request for metadata associated with the data object schema to the remote computing system; and
receiving the metadata associated with the data object schema.

17. The method of claim 14, further comprising:
presenting a configuration menu on a display of the client device, the configuration menu including a first field for the criteria and a second field for the threshold;
receiving user input that specifies one or more of the criteria and the threshold; and
sending synchronization configuration information to the remote computing system, the synchronization configuration information indicating the criteria and the threshold.

18. A computing system that implements a synchronization service, the computing system comprising:
memory storing synchronization configuration information comprising a synchronization rule specifying, for a data object schema comprising a plurality of data members, criteria to be applied in selecting which of a plurality of stored data object instances of the data object schema to send to a client device during a synchronization task and a threshold specifying a maximum amount of stored data object instances of the data object schema that may be sent to the client device during the synchronization task; and
a processor configured to execute instructions that implement a download processor, the download processor being configured to analyze the plurality of stored data object instances of the data object schema, determine which of the plurality of stored data object instances meet the criteria, and send the stored data object instances that meet the criteria to the client device until the truncation threshold is met,
wherein each stored data object instance comprises values for the plurality of data members as well as metadata associated with that stored data object instance, and
wherein the criteria comprise at least one particular value for at least one data member of the plurality of data members of the data object schema, and
wherein the threshold is specified with respect to at least one particular metadata attribute of the metadata.

19. The computing system of claim 18, further comprising a data store storing the data object instances.

20. The computing system of claim 18, further comprising a database, the database storing the data object instances and metadata of the data object schema.

* * * * *